(No Model.)
C. W. BLOEMKER.
SCREW CUTTING MACHINE.
No. 558,713. Patented Apr. 21, 1896.
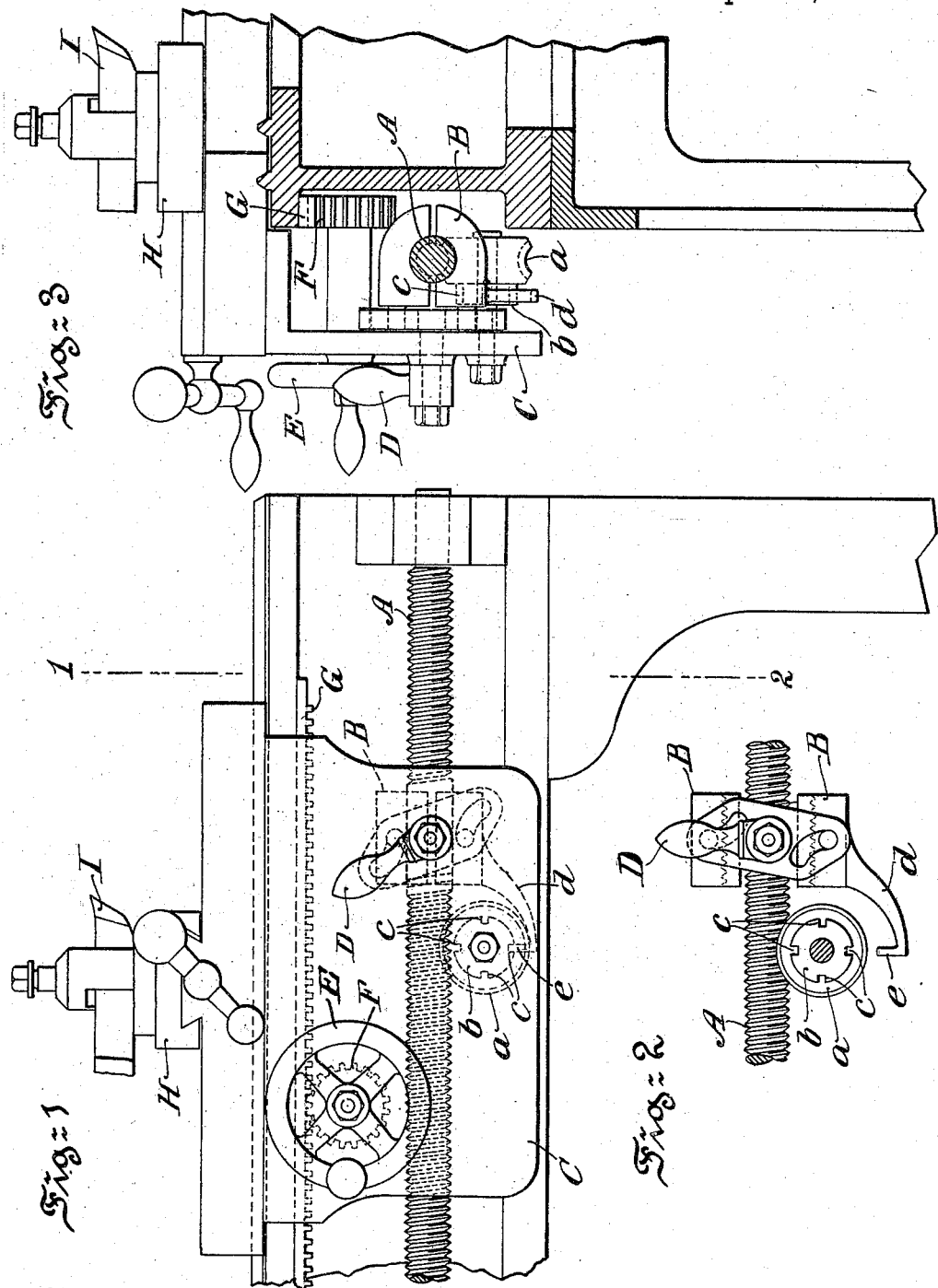
Witnesses:
W. A. Schaefer
Craig Shreds
Inventor.
Charles W. Bloemker
By his attorney
Chas. A. Rutter.

United States Patent Office.

CHARLES W. BLOEMKER, OF PHILADELPHIA, PENNSYLVANIA.

SCREW-CUTTING MACHINE.

SPECIFICATION forming part of Letters Patent No. 558,713, dated April 21, 1896.

Application filed November 27, 1895. Serial No. 570,288. (No model.)

*To all whom it may concern:*

Be it known that I, CHARLES W. BLOEMKER, a citizen of the United States, and a resident of the city and county of Philadelphia, State of Pennsylvania, have invented certain new and useful Improvements in Screw-Cutting Machines, of which the following is a specification.

My invention relates to improvements in screw-cutting machinery, and more particularly to improvements in that class of screw-cutting machinery in which the cutting movements of the screw-cutting tool are determined by the rotation of a lead-screw.

The movement of the cutting-tool of a lathe or other screw-cutting machine, when driven by a lead-screw, is necessarily slow, and when the lead-screw has an even number of threads per inch or other unit of length, which is generally the case, it is the practice, when cutting screws of an even number of threads per inch or other unit of length, when the tool has reached the end of the cut, to disengage the nut through which the motion of the lead-screw is transmitted to the tool-carrying carriage from the lead-screw, to withdraw the tool from the thread being cut, and then to rapidly return the carriage backward, so that the cutting-tool may at once be entered to take another cut. When the lead-screw has an even number of threads per inch or other unit of length and the cutting-tool is cutting an uneven number of threads per inch or other unit of length, it is very difficult, if the carriage be reversed, as above described, to seat the driving-nut on the lead-screw so that the cutting-tool will enter its former cut exactly, and for this reason it is the practice, particularly when large and expensive threads of this kind are being cut, to return the cutting-tool to its first position by reversing the movement of the lead-screw, driving the carriage back to its first position by the rotation of this screw. This causes a great loss of time. In such cases my attachment makes it possible to throw the nut which is driven by the lead-screw out of contact with this screw at the end of the cut, to move the carriage instantly back to its first position, and to cause the nut to again engage the screw, so that the cutting-tool may be again entered in the work at exactly the proper point.

In the accompanying drawings, forming part of this specification, and in which similar letters of reference indicate similar parts throughout the several views, Figure 1 is a front view of part of a lathe furnished with my attachment; Fig. 2, a section of Fig. 1 on line 1 2, and Fig. 3 a detached view of my attachment and part of the lead-screw.

A is the lead-screw; B, the nut carried by the carriage C, which is of the ordinary construction, and which may be thrown into or out of gear with the lead-screw by means of a handle D. E is a hand-wheel carried by carriage C, upon the shaft of which is a pinion F, which is adapted to engage with a rack G, carried by the bed-plate of the lathe. H is the slide-rest and I the cutting-tool. The construction and operation of all these parts are so well known as to need no further description here.

*a* is a worm-gear gearing into the threads of lead-screw A. The number of teeth upon this gear are some multiple of the number of threads per inch, or other unit of length, upon the screw A. We will suppose that the screw has six threads per inch and that the gear is furnished with twenty-four teeth.

On the shaft of gear *a* is a disk (or, as shown in the drawings, it may be the hub of gear *a*) *b*, which is furnished with as many notches *c* as the teeth of the gear are the multiple of the threads per inch of the screw, in the present case four, equidistant from one another.

*d* is an arm carried by one side of nut B, which is furnished with a point *e*, adapted to engage the notches *c* in hub *b* when the nut B is closed upon screw A and to be out of contact with these notches and the hub when the nut is out of contact with the screw A. When the cutting-tool I is cutting the thread, the nut B is in contact with the lead-screw A and the point *e* of arm *d* rests in one of the notches *c*, holding the gear *a* stationary. Therefore during the forward movement of the carriage the threads of screw A simply turn in the teeth of this gear. When the cutting-tool has been carried as far forward as necessary and it is desired to return it to the other end of the thread which it is cutting, it being understood that it is cutting an uneven number of threads to the inch, the nut B is opened so as to be out of contact with screw A, the same movement moving arm $d$ out of contact with notched disk $b$. The hand-wheel E and pinion F are now turned and this latter engaging with rack G rapidly moves carriage C back to its first position, and while this backward movement of the carriage is taking place the teeth of gear $a$ have been engaging with the threads on the lead-screw, and this wheel and the notched disk have been rotating one-quarter turn for each inch that the carriage has been moved backward. The carriage having been moved backward the desired distance the operating-handle D is turned so as to close nut B upon the lead-screw A; but in order that this nut may close upon the screw it is necessary that the point $e$ of arm $d$ shall enter one of the notches $c$ in hub $b$. If the point $e$ strikes the hub to one side or the other of a notch, the nut cannot be closed and it is necessary to move the carriage forward or backward in order to turn gear $a$ and hub $b$ so that the point $e$ may enter the notch. When the notch is moved opposite the point, the nut can be closed and not until then.

As the lead-screw has six threads per inch, the gear $a$ twenty-four teeth, and the hub four equidistant notches, it follows that the nut B can only be closed down on the threads of the lead-screw at exactly the same point on each inch thereof; in other words, that the nut can only engage the lead-screw at certain predetermined points. Consequently the cutting-tool I, if its position in the tool-holder remains unaltered, will always be guided so that it will mesh exactly with the thread that it is cutting.

I am aware that screw-cutting machines have heretofore been furnished with means which prevent the lead-screw from closing upon the lead-nut except at certain predetermined points in order to cause the cutting-tool to always mesh with the screw being cut. I therefore do not claim my invention broadly; but What I do claim is—

The combination with the lead screw and nut of a screw-cutting machine of a vertically-placed gear the teeth of which mesh with the threads of said screw and the number of which are a multiple of the number of threads upon an inch or other unit of length of said screw, a disk or hub turning with said gear furnished with a notch or notches at equidistant intervals in number equal to the ratio between the number of threads on an inch or other unit of length of said screw and the number of teeth on said gear, and an arm carried by said nut the outer end of which is bent so as to enter one of said notches in said hub or disk when the nut is closed upon the lead-screw.

CHARLES W. BLOEMKER.

Witnesses:
CHRISTOPHER FALLON,
CHARLES A. RUTTER.